Sept. 11, 1923.                                                    1,467,618
                        G. H. HARTMAN
             AUTOMOBILE WHEEL HOLDING AND TRUING DEVICE
                      Filed Aug. 16, 1922

Inventor
George H. Hartman
By F. K. Bryant
                Attorney

Patented Sept. 11, 1923.

1,467,618

UNITED STATES PATENT OFFICE.

GEORGE H. HARTMAN, OF ITHACA, NEW YORK.

AUTOMOBILE WHEEL HOLDING AND TRUING DEVICE.

Application filed August 16, 1922. Serial No. 582,150.

*To all whom it may concern:*

Be it known that I, GEORGE H. HARTMAN, a citizen of the United States of America, residing at Ithaca, in the county of Tompkins and State of New York, have invented certain new and useful Improvements in Automobile Wheel Holding and Truing Devices, of which the following is a specification.

This invention relates to certain new and useful improvements in automobile wheel holding and truing devices and has particular reference to an apparatus employed for straightening or truing the fellys of automobile wheels and the metallic felly band enclosing the same, simultaneously truing the wheel felly and repositioning the outer ends of the spokes extending through the felly into the openings provided therefor in the metallic felly band.

The primary object of the invention resides in the provision of an automobile wheel holding and truing device in the form of a stand having clamping devices at the head thereof anchoring an automobile wheel on the head of the same with a screw operated clamping block positioned above the warped bent portion of the felly for restoring the same to its proper position and true with the remaining portion of the wheel.

With the above and other objects in view, the invention consists of the novel form, combination and arrangement of parts hereinafter more fully described, shown in the accompanying drawing and claimed.

Figure 1:
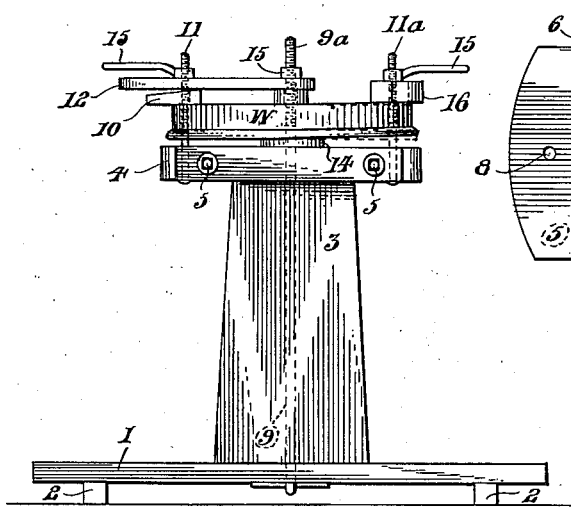
Figure 3:
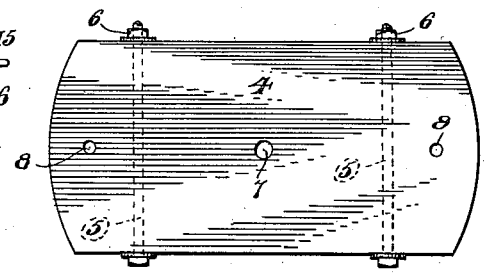
Figure 4:
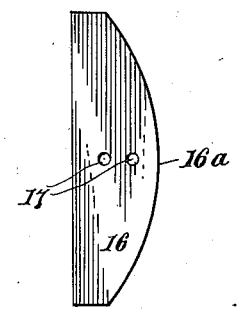
Figure 2:
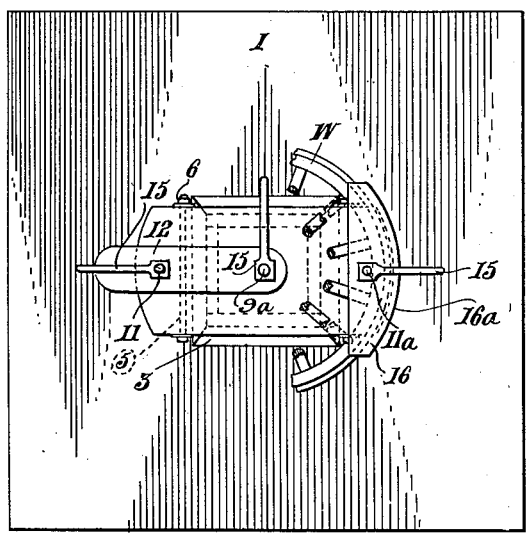
Figure 5:
Figure 6:
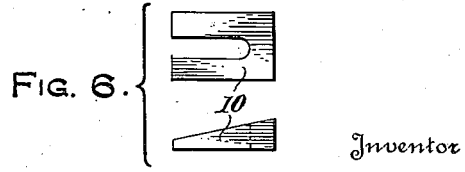

In the drawing, wherein like reference characters designate corresponding parts throughout the several views, Figure 1 is a side elevational view of an automobile wheel holding and truing device constructed in accordance with the present invention, showing a wheel clamped upon the head of the supporting stand and further illustrated by dotted lines as having been restored to its proper shape, Figure 2 is a top plan view of the device with a portion of a spoke wheel mounted therein, Figure 3 is a top plan view of the head of the supporting stand, Figure 4 is a plan view of an arcuate block to be placed in engagement with the warped or bent side of the wheel felly, Figure 5 is a plan view of the wheel clamping arm, and Figure 6 shows plan and side elevational views of a slotted wedge block associated with the clamping arm and wheel felly.

Referring more in detail to the accompanying drawing, and particularly to Fig. 1 there is illustrated a device for holding and truing automobile wheels, the floor plate 1 being mounted upon feet 2 and supporting a centrally positioned standard 3 preferably of rectangular formation upon the upper end of which a cross head 4 is supported. For bracing the cross head 4 and preventing warping or bending thereof, cross bolts 5 extend transversely therethrough as clearly shown in Figs. 1 and 3 and are anchored therein by jamb nuts 6. Said cross head 4 is provided with a centrally positioned opening 7 and lateral end openings 8 as shown in Fig. 3 for purposes presently to appear. A perpendicular shaft 9 is anchored at its lower end to the floor plate 1, the upper end thereof being threaded as at $9^a$ and extending through the central opening 7 in the cross head 4 as shown in Fig. 1.

In truing a spoked wheel by straightening a warp or bend therein, the wheel W is positioned above the cross head 4 with the upper threaded end of the shaft 9 extending through the wheel hub, the wheel W being placed upon the head 4 with the warped or bent side thereof extending upwardly as shown in Fig. 1. A slotted wedge block 10, shown in detail in Fig. 6 is mounted upon the felly of the wheel W at the lowest side thereof, a screw bolt 11 secured in one of the end openings 8 in the cross head extending upwardly through the wheels inwardly of the felly and through the slotted wedge block 10. A plate arm 12 having an opening 13 in one end thereof is received on the upper threaded end $9^a$ of the shaft 9 for engaging the adjacent side of the wheel hub H while the screw bolt 11 extends through either of the openings 14 at the other end of the plate arm while a handle nut 15 is threaded upon the upper ends of the screw bolt 11 and shaft 9 for holding the plate arm 12 in position. The slotted wedge block 10 may be shifted to insure the proper horizontal position of the plate arm 12 when engaged by the handle nut 15 for anchoring the wheel W rigidly upon the upper end of the standard 3 and cross head 4.

The clamping and bending block 16 shown in Fig. 4 has an outer edge $16^a$ curved on an arc coincident to the periphery of the wheel W, said block having openings 17 therein for the selective reception of the screw bolt 11ᵃ passing upwardly through the opening 8 in the opposite end of the cross head 4 and inwardly of the wheel felly with a handle nut 15 threaded upon the upper end of the screw bolt 11ᵃ for binding the clamping block 16 to bend the warped portion of the wheel between said clamping block and the adjacent end of the cross head 4 as indicated by dotted lines in Fig. 1. Simultaneously with this movement, i. e., the straightening or truing of the warped or bent portion of the wheel felly, pressure is applied to the metallic rim enclosing the felly which will shift the same with the felly and cause the adjacent outer ends of the spokes projecting through the felly to be properly positioned in the rim-sockets therefor. The wheel is then allowed to set a sufficient length of time, it being understood that suitable gage devices have been applied thereto for accurately determining the operation thereof, and when removed from the wheel holding and truing device, said wheel will have been restored to its original condition properly trued and with the ends of the spokes confined within the sockets provided in the metallic felly band.

While there is herein shown and described the preferred embodiment of the present invention, it is nevertheless to be understood that minor changes may be made in the invention without departing from the spirit and scope thereof as claimed.

What I claim is:—

1. In a wheel holding and truing device, a supporting standard, a cross head carried by the upper end thereof, screw bolts extending upwardly from said cross head, a perpendicular shaft extending upwardly through said cross head and threaded at its upper end, a plate arm extending between one of said screw bolts and the upper end of the threaded shaft, a clamping block associated with the other screw bolt and handle nuts threaded on the screw bolts at the upper end of the threaded shaft.

2. In a wheel holding and truing device, including a supporting stand adapted to have the wheel positioned thereon, means for rigidly anchoring the hub of the wheel and the lower true side of the felly to said supporting stand, an adjustable clamp associated with said supporting stand and the warped side of the wheel felly, the wheel anchoring means including a plate arm extending between the wheel hub and unwarped side of the felly, and a slotted wedge block interposed between the outer end of said arm and felly.

In testimony whereof I affix my signature.

GEORGE H. HARTMAN.